May 24, 1949.　　　　W. H. RODEFELD　　　　2,471,350
PICKUP HAY WAGON
Filed Jan. 27, 1947　　　　　　　　　　　　2 Sheets-Sheet 1
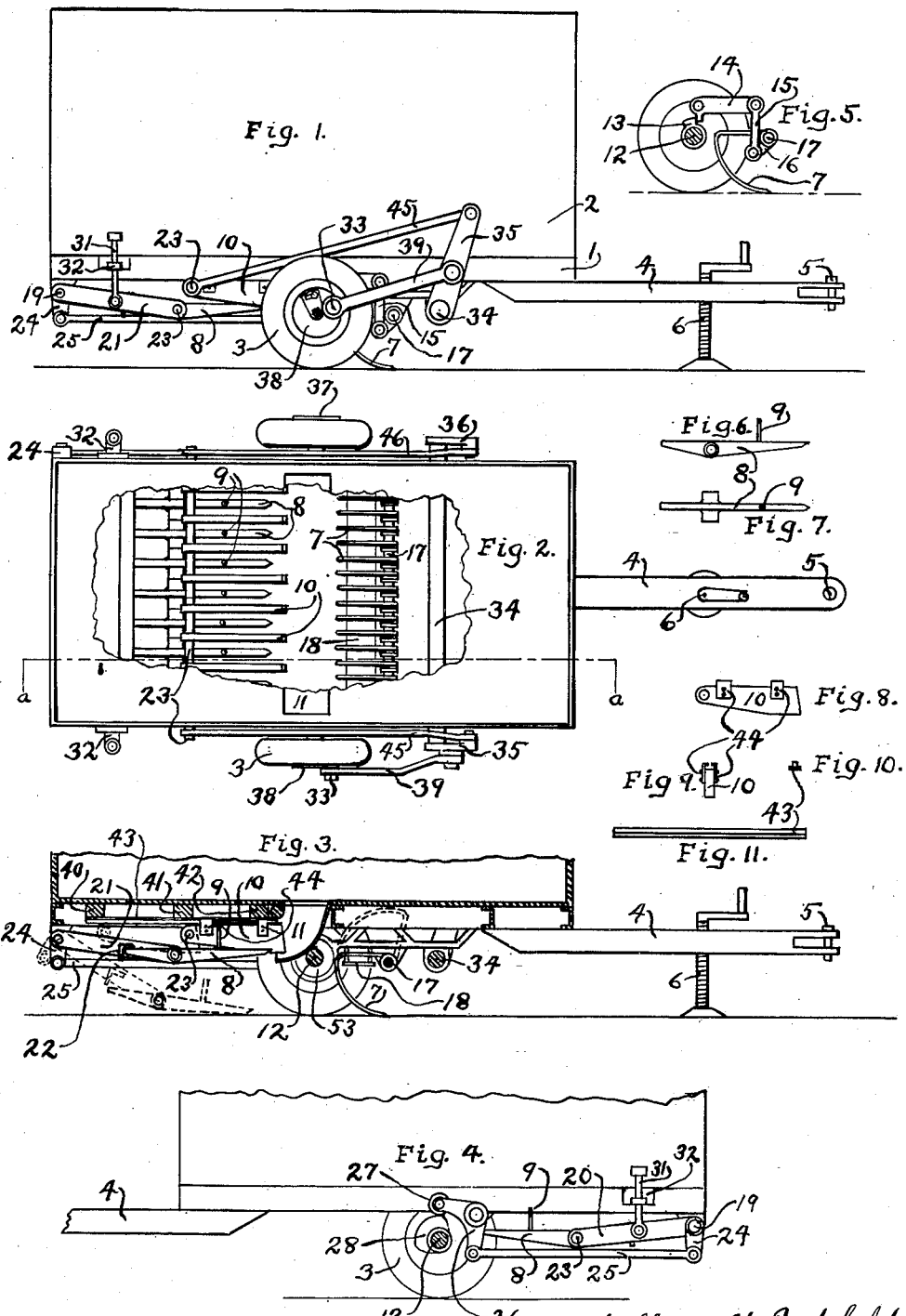
William H. Rodefeld.
Inventor.

May 24, 1949.  W. H. RODEFELD  2,471,350
PICKUP HAY WAGON
Filed Jan. 27, 1947  2 Sheets-Sheet 2
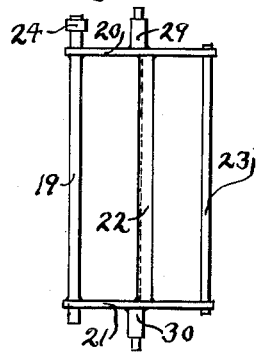
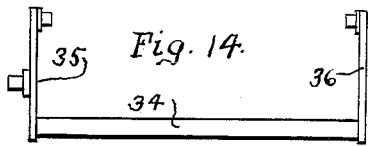
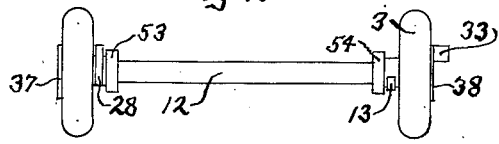
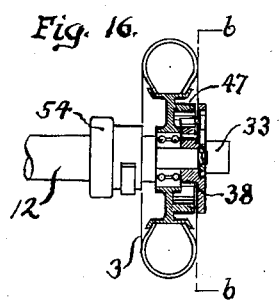
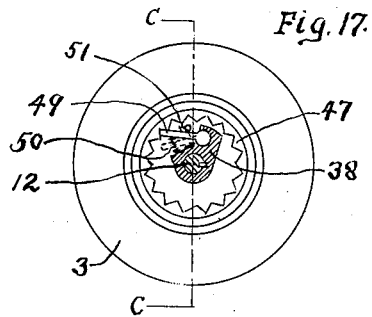
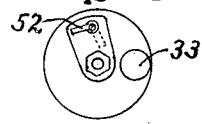
William H. Rodefeld.
Inventor.

Patented May 24, 1949

2,471,350

UNITED STATES PATENT OFFICE 2,471,350

PICKUP HAY WAGON

William H. Rodefeld, Richmond, Ind.

Application January 27, 1947, Serial No. 724,506

6 Claims. (Cl. 214—79)

My present invention relates to machines for taking up hay and similar material, more particularly to such machines that take up such material automatically and that require no attendant or operator other than one person to drive a tractor or other means to pull the machine.

The principal object of the invention is the provision of an improved machine to take up hay and similar material.

Another object is the provision of a low cost machine to do such work.

Another object is the provision of a machine to do such work at low cost.

Another object is the provision of a machine to do such work more rapidly.

Another object is the provision of a machine to do such work rapidly and at low cost and with a minimum of man power.

Another object is to provide a machine to take up hay and similar material in bunches with each bunch being sufficiently compressed so that the material will remain bunched in transportation and in storage and that will be easily removed from storage owing to its having been bunched as it was taken up from the ground.

Another object is to provide such a machine that is simple and without gears or sprockets and chains.

Another object is to provide such a machine having a supporting axle and wheels thereon and means whereby the wheels may turn on the axle when the machine is moving but not taking up material and whereby the axle may be turned by the wheels when desired.

Another object is to provide such a machine in which parts that operate raking and loading mechanism are on the axle.

Another object is to provide such a machine with a set of raking teeth to rake up material as the machine moves and arranged to leave the raked material bunched and a set of take-up teeth to take up the bunched material and elevate it and a reciprocating assembly arranged to push the material from the take-up teeth and with the raking teeth being operated by a cam or lug on an axle and the take-up teeth being operated by a cam on the axle and the reciprocating assembly being operated by a crank or eccentric on the axle.

Another object is the provision of a machine having raking teeth to rake material into bunches and take-up teeth to take up the bunches of material and reciprocating parts to push the material from the take up teeth and a chute for the material to pass through and a compartment to receive the material from the chute.

The objects and advantages of the invention will suggest themselves in the following description and that which is new will be pointed out in the appended claims.

My preferred means for carrying out the principles of the invention in a practical and efficient manner is shown in the accompanying two sheets of drawing, in which:

Figure 1 is a side view of the machine built as a two wheel conveyance. This machine can be built with four wheels which construction would be preferred in case of use with horse power. The two wheel construction is preferred by me for use with tractor power.

Figure 2 is a top view of the machine with a large section of the floor of the carrying compartment and other parts cut away to show the raking teeth and the take-up teeth and the reciprocating parts that push the material from the take-up teeth into the chute. In the portion of the floor not cut away can be seen both ends of a large slot that extends across the floor and that is the upper end of the chute through which material enters the carrying compartment.

Figure 3 is a vertical cross section on line a—a of Figure 2. In this view the raking teeth are shown just forward of the axle in down position where they will rake up material as the machine moves forward and in broken lines the raised position of the raking teeth is shown. The take-up teeth are shown in Figure 3 in raised position with the points of the teeth near the mouth of the chute and in broken lines the take-up teeth are shown in down position in which position they pass under bunched material left by the raking teeth as the machine moves forward. Also in Figure 3 is shown pusher members that are carried by rails fastened to cross members under the floor of the machine, after the take-up teeth have raised a bunch of material the pusher members come forward and push the material into the chute. The pusher members are shown in forward position with broken lines showing their rear position. Also in Figure 3 is shown a carrying assembly that carries the take-up teeth, and the down position of the carrying assembly is shown also in broken lines.

Figure 4 is a partial left side view of the machine with the left wheel removed. This view shows mechanism that raises the take-up teeth.

Figure 5 shows means to raise the raking teeth.

Figure 6 is a side view of one of the take-up teeth.

Figure 7 is a top view of one of the take-up teeth.

Figure 8 is a side view of one of the pusher members.

Figure 9 is a front view of one of the pusher members.

Figure 10 is a front view of one of the rails that carry the pusher members.

Figure 11 is a side view of one of the rails that carry the pusher members.

Figure 12 is a top view of the carrying assembly that carries the take-up teeth.

Figure 13 is a front view of one of the stop rods that control the position of the teeth carrying assembly when it is down.

Figure 14 is a front view of a lever and shaft assembly that connects to the set of pusher members and to a crank pin carried by a flange that is keyed to the axle.

Figure 15 is a top view of the axle and wheels and shows the axle bearings on the axle and the cam that operates the take-up teeth next to the left wheel and the cam that operates the raking teeth next to the right wheel and the crank pin that operates the reciprocating assembly including the pusher members, outside of the right wheel.

Figure 16 shows the right end of the axle with the axle bearing and the cam that operates the raking teeth and a sectional view of the right wheel and a driving flange that is keyed to the end of the axle and that carries a pawl that engages teeth in the inner periphery of a cylindrical extension from the outer side of the wheel. Figure 16 and subsequent figures are drawn to a larger scale than Figures 1 to 15 inclusive. The sectional view of the wheel and driving flange in Figure 16 is on line c—c of Figure 17.

Figure 17 is a sectional view on line b—b of Figure 16. Figure 17 shows the hub of the driving flange and the part that carries the pawl and the pawl is shown in engagement with the notches and in broken lines the pawl is shown out of engagement with the notches.

Figure 18 shows the outer side of the driving flange and shows the crank pin that operates the reciprocating assembly and also a nut that holds the flange on the axle and a trigger that is on the outer end of a small shaft that passes through the flange and has on its inner end a small cam that when turned presses the pawl out of engagement with the notches to permit the wheel to turn without turning the axle. A small spring under the pawl holds the pawl outward. The trigger is shown in position to permit the spring under the pawl to press the pawl into engagement with the wheel to turn the axle. Broken lines show the position of the trigger when the pawl is dis-engaged from the wheel. In this position the cam against the pawl is turned far enough so that the spring pressure against the pawl holds the cam in past center position where it remains until the trigger is moved by the operator. This means provides the way to engage and disengage the wheels and axle to put the mechanism of the machine in operation and out of operation. The same arrangement is used on both wheels and the pawl drive permits over-running of the outside wheel in turning. The triggers and the nuts that hold the wheels on are in depressions in the face of the flanges so as not to protrude beyond the face of the flanges.

Like characters designate like parts throughout the several views.

In order that the construction, the operation, and the advantages of the invention may be more fully understood and appreciated I will now take up a detailed description thereof, in which I will set forth the same as fully and as comprehensively as I may.

Referring now to the drawings, the numeral 1 designates the right side frame member of the machine, 2 is the right side of a load carrying compartment, 3 is the right wheel, 4 is the tongue by means of which the machine is pulled, 5 is a coupling pin for coupling to a tractor or other pulling unit, 6 is a jack screw to support the front of the machine when it is not hitched to a pulling unit and to raise or lower the tongue to facilitate coupling at different heights.

Number 7 is the raking teeth that rake material as the machine moves forward, 8 is the take-up teeth that pass under bunches of material left by the raking teeth and then rise and raise the material taken up, 9 is an upward extending member on the take-up teeth that limits the movement of material back on the elevating teeth, 10 is the pusher members of the reciprocating assembly that pushes the material into the chute, 11 is the chute into which material is pushed from the take up teeth 8 by the pusher members 10 and through which material passes as it moves into the carrying compartment.

Number 12 is the axle that extends across under the machine between the wheels and on which the wheels are mounted to turn freely when the machine is moving but not taking up material and which turns with the wheels when the machine is taking up material.

Number 13 is the cam fastened to the axle that raises the raking teeth 7. Cam 13 moves the lever 14 which is connected by the link 15 to a lever 16 which is on the shaft 17 that carries the raking teeth 7. A stripper member 18 is located in position to strip the material from the teeth 7 when the teeth 7 rise.

As the machine is moving forward while taking up material the take-up teeth 8 which are timed to be down when the raking teeth 7 rise immediately pass under the bunch of material dropped by the raking teeth 7. The raking teeth 7 return to the ground immediately after passing over the bunch of material dropped.

Immediately after passing under the bunch of material the take-up teeth rise from the position shown by broken lines in Figure 3 to the position shown by solid lines. At this time the pusher members 10 are in the back position shown by broken lines in Figure 3 and are thus back of the bunch of material raised by the take-up teeth 8. The pusher members then come forward and push the material from the take-up teeth 8 and into the chute 11. The take-up teeth 8 remain in raised position until the pusher members come forward then return to the ground in time to take up the next bunch of material dropped by the raking teeth. The pusher members 10 press the material into the chute and then return to rearward position in time to be out of the way of the next bunch of material raised by the take-up teeth. When the pusher members 10 move rearward the material remains in the chute 11. Each bunch of material pushed into chute 11 pushes material already therein up into the carrying compartment of the machine.

The take-up teeth 8 are carried by a carrying assembly (Fig. 12) which consists of a shaft 19 to which are welded two side arms 20 and 21, an angle iron cross bar 22 connects the two side arms. A shaft 23 passes through the side arms 20 and 21 and this shaft carries the take-up teeth 8 with the take-up teeth 8 being free to move thereon sufficiently for the points of the teeth to follow uneven ground. Tight on one end of shaft 19 is a lever 24. Extending forward from lever 24 is a connecting rod 25 the forward end of which connects to a rocker arm 26 which carries a roller 27. A cam 28 on axle 12 working against the roller 27 moves the rocker arm 26 to raise the teeth carrying assembly and the take-up teeth 8. When the teeth carrying assembly rises the back ends of teeth 8 strike the angle iron cross bar 22 and this holds the teeth 8 in line as they rise. Members 29 and 30 project outward from the side members 20 and 21 of the teeth carrying assembly. Stop rods 31 mount on the outer ends of members 29 and 30 and extend upward through brackets 32 on the frame of the machine through which they slide freely when the take-up teeth are raised or lowered and the collars on the upper ends of stop rods 31 strike the brackets 32 to control the position of the teeth carrying assembly when the take-up teeth 8 are down.

A cross shaft 34 extends across the machine below the frame and forward of the raking teeth. Extending upward from the ends of shaft 34 are arms 35 and 36.

A flange 37 is keyed to the left end of axle 12. A flange 38 is keyed to the right end of axle 12. Flanges 37 and 38 are similar but flange 38 carries a crank pin 33.

A connecting rod 39 connects the crank pin 33 and the arm 35. It can be seen that when the axle turns the arms 35 and 36 will be moved back and forward by the crank pin 33 and the connecting rod 39.

Under the floor of the load carrying compartment back of chute 11 are three cross members 40, 41, and 42. Fastened to these cross members are rails 43. Figure 10 is an end view and Figure 11 a side view of one of these rails.

The reciprocating assembly that forces the material through the chute consists of a plurality of the pusher members 10. Through the back end of each pusher member 10 is a shaft 23. Shaft 23 extends beyond the frame side members.

On the pusher members 10 are members 44 that straddle the rails 43 to hang the pusher members from the rails 43. The pusher members 10 move forward and backward with the members 44 sliding on the rails 43.

A connecting rod 45 connects the upper end of arm 35 and the shaft 23 and a connecting rod 46 connects the upper end of arm 36 and shaft 23.

It can now be seen that when the machine moves and the axle turns the pusher members will slide back and forward on the supporting rails. The pusher members 10 are spaced to pass between the upright projections 9 on the take-up teeth 8 with the lower portion of the pusher members 10 passing between the take-up teeth 8 and substantially parallel therewith.

The wheels are mounted to turn freely on the axle when the machine is moving with the loading mechanism out of operation. When the loading mechanism is in operation the wheels turn the axle through a pawl and ratchet arrangement at each wheel. A cylindrical extension 47 on the outer side of each wheel has a notched inner periphery. The driving flanges 37 and 38 each carry on the inner side a pawl 49. Springs 50 press the pawls outward to engage the notches in the wheel extensions. When the pawls are in this position the axle turns and the mechanism operates. A small cam 51 is turned by a trigger 52 on the outside of the flange to hold the pawl away from the notches and permit free turning of the wheel. This cam and trigger arrangement is used at both wheels.

Numbers 53 and 54 are the axle bearings.

Having now shown and described the invention, what I claim, and desire to secure by Letters Patent of the United States, is:

1. In a machine to take up hay and similar material a set of forwardly extending teeth arranged to pass under material as the machine moves forward and arranged to rise with the said material, a plurality of pushers arranged to move forward between the said teeth when raised and with the pushers arranged to move beyond the ends of the teeth and into a passage to a compartment.

2. In a machine to take up hay and similar material a set of teeth arranged to pass under material as the machine moves forward and then to rise and raise the material and a pusher assembly arranged to move forward to push the material from the said teeth and into a passage way with part of the pusher assembly entering the passage way.

3. In a machine to take up hay and similar material, raking means arranged to rake material and then leave it bunched on the ground, a cam on a supporting axle to control the said raking means, teeth to take up the said bunched material and raise it, a cam on the said axle to raise the said teeth, pusher means to push the said material into a load compartment and a crank on the said axle to operate the said pusher means.

4. In a machine to take up hay and similar material, supporting wheels on a rotatable axle, a set of raking teeth and a cam on the said axle to raise the said raking teeth, a set of take-up teeth and a cam on the said axle to raise the said take-up teeth, means to push material from the said take-up teeth and a crank pin on the said axle to operate the said pushing means.

5. In a machine to take up hay and similar material, supporting wheels on a rotatable axle, a set of raking teeth and a cam on the said axle to raise the said raking teeth, a set of take up teeth and a cam on the said axle to raise the said take up teeth, a plurality of pusher members arranged to push the material from the said take up teeth and a crank on the said axle to operate the said pusher members.

6. In a machine to take up hay and similar material, a set of raking teeth, a set of take-up teeth, a set of pusher members, means to raise the raking teeth at intervals as the machine moves, means to raise the take-up teeth when the machine has traveled a certain distance after the raking teeth were raised and means to move the pusher members along the take-up teeth from rear to front thereof while the take-up teeth are in raised position and with the means to operate the said parts in proper sequence consisting primarily of cams and a crank on an axle.

WILLIAM H. RODEFELD.

(References on following page)

REFERENCES CITED

The following references are of record in the file of this patent:

UNITED STATES PATENTS

| Number | Name | Date |
|---|---|---|
| 13,234 | Soule | July 10, 1855 |
| 54,392 | Nevergold et al. | May 1, 1866 |
| 704,740 | Foglesong | July 15, 1902 |
| 1,471,302 | Wright et al. | Oct. 16, 1923 |
| 1,782,067 | Hassman | Nov. 18, 1930 |
| 2,099,604 | Gunning | Nov. 16, 1937 |
| 2,107,119 | Price | Feb. 1, 1938 |
| 2,252,608 | Ballert | Aug. 12, 1941 |
| 2,341,945 | Rabon | Feb. 15, 1944 |
| 2,398,327 | Rodefeld | Apr. 9, 1946 |
| 2,398,584 | Goodrich | Apr. 16, 1946 |
| 2,404,154 | Williams | July 16, 1946 |
| 2,405,534 | Voth | Aug. 6, 1946 |
| 2,405,756 | Rodefeld | Aug. 13, 1946 |